United States Patent [19]

Mauger

[11] Patent Number: 5,345,498
[45] Date of Patent: Sep. 6, 1994

[54] MOBILE COMMUNICATIONS SYSTEMS AND INTERCONNECTIONS STRATEGIES FOR USE BETWEEN DIFFERENT NETWORKS AND DIFFERENT TARIFFS OF SUCH SYSTEMS

[75] Inventor: Roy Mauger, Enfield, United Kingdom

[73] Assignee: Northern Telecom Limited, Montreal, Canada

[21] Appl. No.: 29,992

[22] Filed: Mar. 12, 1993

Related U.S. Application Data

[63] Continuation of Ser. No. 717,315, Jun. 18, 1991, abandoned.

[30] Foreign Application Priority Data

Jun. 18, 1990 [GB] United Kingdom .............. 9013596.3

[51] Int. Cl.$^5$ .................. H04M 11/00; H04M 15/00; H04J 4/00; H04Q 7/00
[52] U.S. Cl. ........................................ 379/58; 379/59; 379/60; 379/63; 379/112; 370/50; 455/33.1; 455/54.1
[58] Field of Search ..................... 379/56, 57, 58, 60, 379/63, 90, 91, 112; 455/33.1

[56] References Cited

U.S. PATENT DOCUMENTS

| | | | |
|---|---|---|---|
| 4,284,848 | 8/1981 | Frost .................................... | 379/121 |
| 4,675,863 | 6/1987 | Paneth et al. ........................ | 370/50 |
| 4,748,655 | 5/1988 | Thrower et al. ..................... | 379/60 |
| 4,775,999 | 10/1988 | Williams .............................. | 379/59 |
| 4,829,554 | 5/1989 | Barnes et al. ........................ | 379/58 |
| 4,833,701 | 5/1989 | Comroe et al. ...................... | 379/60 |
| 4,939,785 | 7/1990 | Murata et al. ....................... | 455/54 |
| 4,955,050 | 9/1990 | Yamauchi ............................. | 379/59 |
| 4,984,290 | 1/1991 | Levine et al. ........................ | 455/33 |
| 5,027,388 | 6/1991 | Bradshaw et al. ................... | 379/112 |
| 5,036,531 | 7/1991 | Spear .................................... | 379/58 |
| 5,097,499 | 3/1992 | Cosentino ............................ | 379/59 |
| 5,109,400 | 4/1992 | Patsiokas et al. .................... | 379/57 |

FOREIGN PATENT DOCUMENTS

| | | | |
|---|---|---|---|
| 2245455 | 1/1992 | United Kingdom ................. | 379/63 |
| 2249693 | 5/1992 | United Kingdom ................. | 379/63 |

OTHER PUBLICATIONS

Ameritech Mobile Communications, "Ameritech Mobile Phone Service Plans and Features", Jan., 1990.
Rolle, "Mobile Radio:Heading for a European Standard", Siemens Review, Mar. 1990.
Murray, "Why Wireless Voice in the Office", Oct. 1991.

*Primary Examiner*—Curtis Kuntz
*Assistant Examiner*—William Cumming
*Attorney, Agent, or Firm*—Lee, Mann, Smith, McWilliams, Sweeney & Ohlson

[57] ABSTRACT

A flexible and equitable PCN/PSTN interconnection strategy between a communications network having mobile subscribers, such as a PCN network, and a PSTN whereby to form a communication system in which multiple tariffs can be applied, the tariff applied being determined by the actual location of the mobile subscriber involved in a call. The PSTN (2, 6, 9, 10) is not given total access to the PCN (1, 5, 8, 11) location registers, rather a PSTN to PCN call is via a PCN gateway (5) which does have access to the location registers. The gateway (5) accepts zonal calls with which are associated one tariff (zonal interconnect 4) but for, for example, local or interzonal calls, it provides drop back messages to the PSTN to arrange for appropriate rerouting to other gateways (1, 8) of the PCN which have different tariffs associated therewith (local interconnect 3, interzonal interconnect 7).

5 Claims, 4 Drawing Sheets

MOBILE COMMUNICATIONS SYSTEMS AND INTERCONNECTIONS STRATEGIES FOR USE BETWEEN DIFFERENT NETWORKS AND DIFFERENT TARIFFS OF SUCH SYSTEMS

This application is a continuation of application Ser. No. 717,315, filed Jun. 18, 1991 abandoned.

BACKGROUND OF THE INVENTION

This invention relates to mobile communications and in particular to interconnect strategies between networks.

In Europe there are currently a number of different mobile communications standards which are incompatible with one another so that a terminal designed for one system cannot be used with another. The Groupe Speciale Mobile (GSM) was set up in order to develop a single cellular standard for Europe. A GSM network basically comprises a base-station system (BSS), which includes a base-station controller (BSC) and one or more base-station transceiver stations (BTS), a mobile-services switching centre (MSC), a home location register (HLR) and a visitors location register (VLR). Every subscriber (mobile station MS) is allocated to a home network, and possibly an MSC within that network, this being achieved by making an entry in the HLR. Whenever a mobile is switched on, and at regular intervals thereafter it will register with the system and give its location area (group of cells). If the mobile is not in its home area, the subscriber's data will be added to the VLR of the then local MSC. In the GSM system the MSC attends to the routing of a call to its destination, each MSC being connected to other MSCs, having interfaces for connection to PSTNs (Public Switched Telephone Networks such as BT or Mercury) and other service providers, and network management etc. functions.

Personal Communication Networks (PCN) now being developed in the UK are based on GSM standards but will operate at 1.8 GHz rather than the 900 MHz of the basic GSM standards. PCN systems arose as a result of the UK Government's Department of Trade and Industry "Phone on the Move" document which was basically aimed at improvement to current mobile communications (cellular radiotelephones). The latter are analogue and restricted in capacity due to the limited band of wavelengths currently available. As a result of the UK Government freeing a higher wavelength band, nominally 2 GHz, and the use of digital techniques, improved communications can be obtained. PCNs will not however be restricted to such mobile communications but rather are intended to support communications to and from any standard radio or fixed telecommunication network and hence to provide a single communication network with a universal personal communicator, i.e. a truly personal portable telephone which permits communication at all times. Since the PCNs proposed are based on GSM standards they can include similar components to the GSM network referred to above, or may include variants which are compatible with both GSM and PCN networks.

SUMMARY OF THE INVENTION

According to the present invention there is provided a communications system including a communications network, having mobile subscribers, and a PSTN fixed network interconnected therewith, wherein calls can be set up in either direction between the said networks and multiple tariffs are applicable, the tariff employed for any particular call being determined by the location of the mobile subscriber involved in the call, the same tariff being employed irrespective of the call set-up direction.

BRIEF DESCRIPTION OF THE DRAWINGS

Embodiments of the invention will now be described with reference to the accompanying drawings, in which.

DESCRIPTION OF THE PREFERRED EMBODIMENTS

The interconnect strategy with the PSTN network will be a key factor in the success of PCN networks.

PCN networks require:

local connections at local call rates;

a reciprocal strategy whereby Public Telephone Operators (PTOs) and the PCN operators equitably benefit from the growth of PCN;

an interconnection mechanism that will operate with the PSTN as it actually exists.

Figure 1:
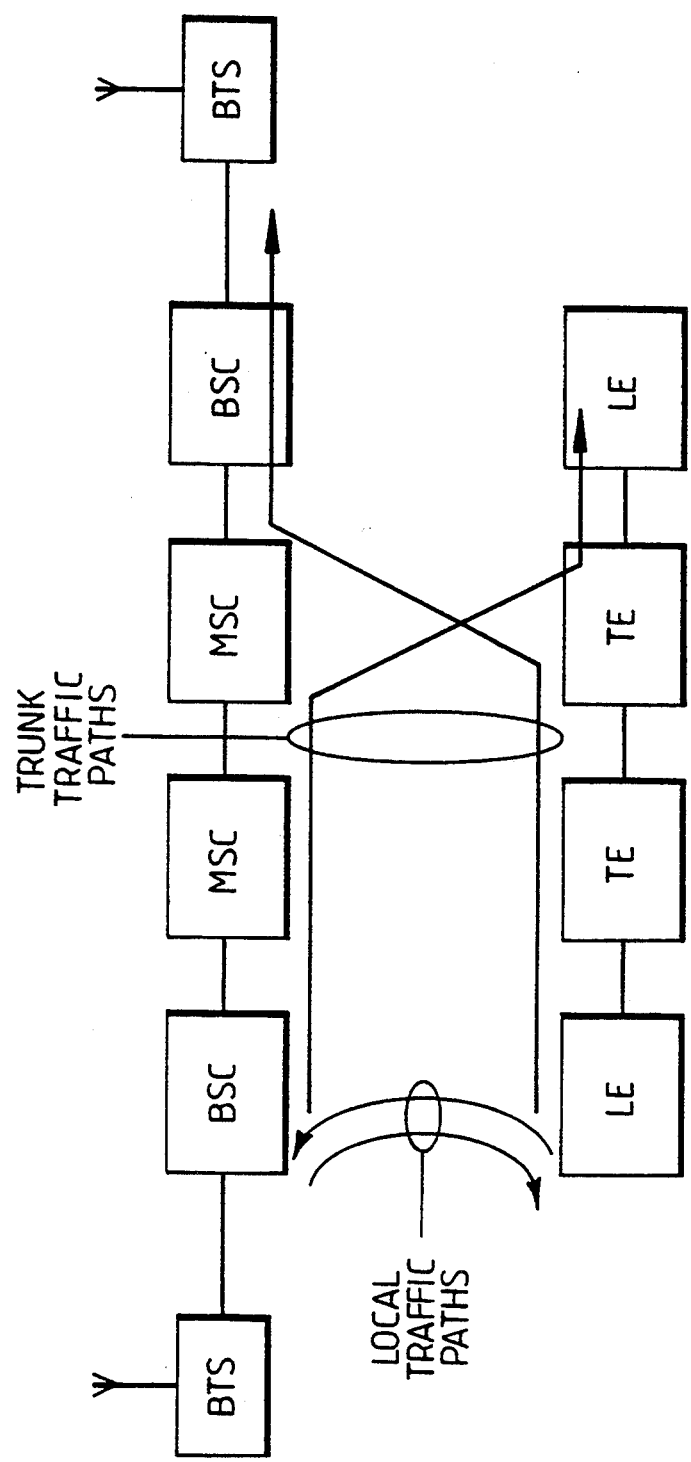
FIG. 1 illustrates an equitable interconnect strategy.

Taking the first two requirements: then a basic equitable interconnect structure would be as illustrated in FIG. 1. Trunk calls originating in the PCN network (BTS, BSC, MSC) are carried by the PCN up to the nearest MSC interface with the PSTN network LE, TE (LE (local exchange) TE (trunk exchange)), and vice versa although there may be local traffic paths between BSCs and LEs as indicated for low cost calls. Attention is directed to our co-pending GB Application No 9013598.9 (Serial No. GB 2245455A) (U.S. application Ser. No. 07/717,317, filed Jun. 18, 1991) (R H Mauger 2) the contents of which are incorporated herein by reference and which describes an intelligent BSC for providing such low cost local calls i.e. routing local calls directly from the BSC to the PSTN LE without involving an MSC by virtue of having a local MSC function and its own location register. The basic structure of FIG. 1 would require the PSTN network to be fully aware of the location of PCN subscribers and this is not currently envisaged. Whilst it is a possible long term objective, it is impractical in the short term.

Figure 2:
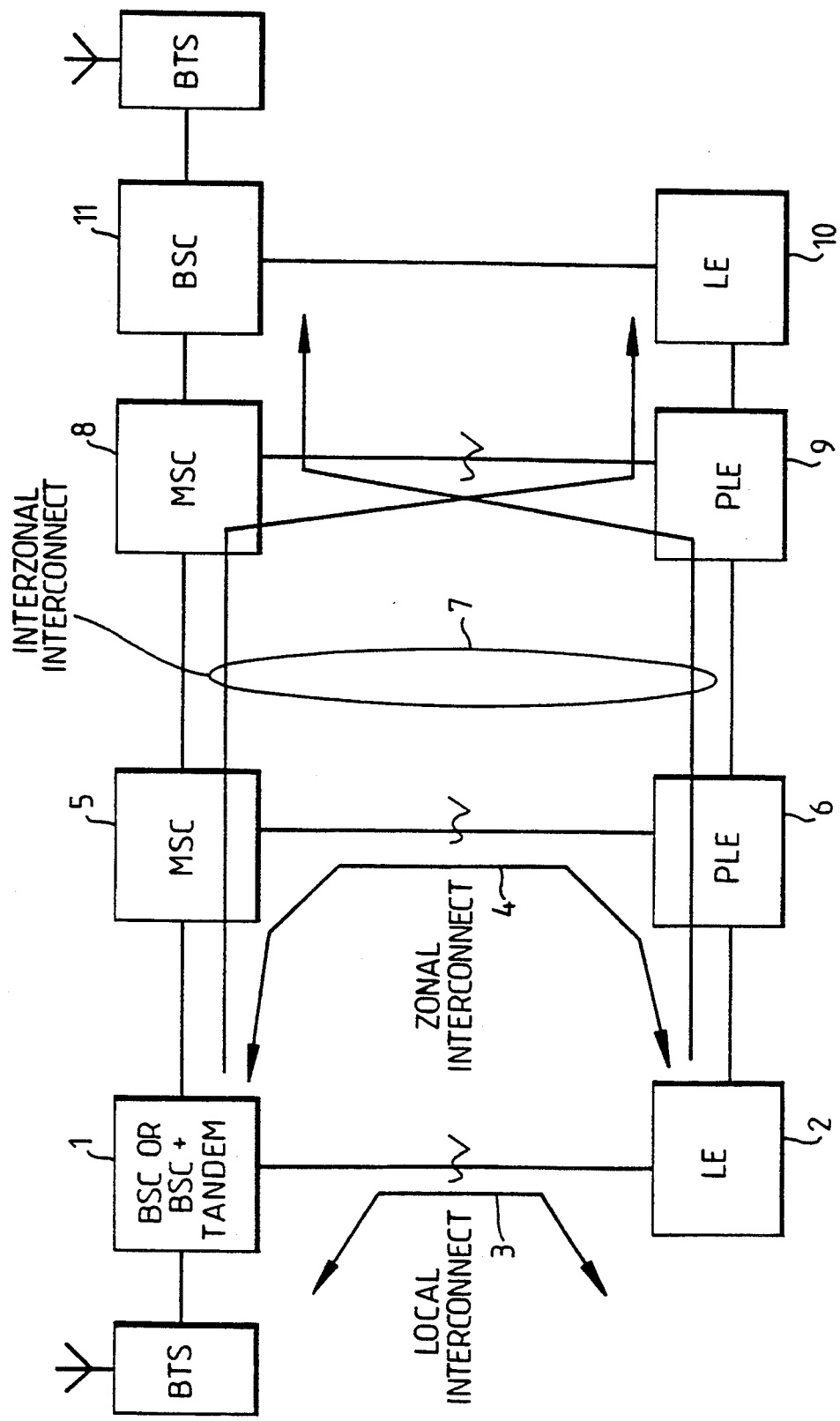
FIG. 2 illustrates another equitable interconnect strategy.

The interconnect strategy illustrated in FIG. 2 is practical at this time and is termed a PCN flexible interconnect. Local traffic in both directions between the PCN BSC 1, and a local PSTN exchange (LE) 2 is routed directly over what is termed a "local interconnect" 3 when the BSC 1 is comprised by an intelligent BSC as described in said co-pending application, or such an intelligent BSC together with a local tandem for an increased capacity system as also described in said co-pending application. There is also a so-called "zonal interconnect" 4 between MSC 5 and a first principal local exchange PLE 6 for calls in both directions between the PCN (BTS, BSC, MSC) and the PSTN (LE, PLE), and an "interzonal interconnect" 7 for calls involving a remote MSC 8 or a remote second PLE 9. This enables three different tariffs to be employed i.e. a PCN local tariff associated with a BSC junction, a PCN zonal network tariff associated with an MSC junction (local) and a PCN interzonal tariff associated with a remote MSC junction.

An example of a numbering and translation scheme which permits the different tariffs to be employed as appropriate will now be described with reference to FIG. 3.

Figure 3:
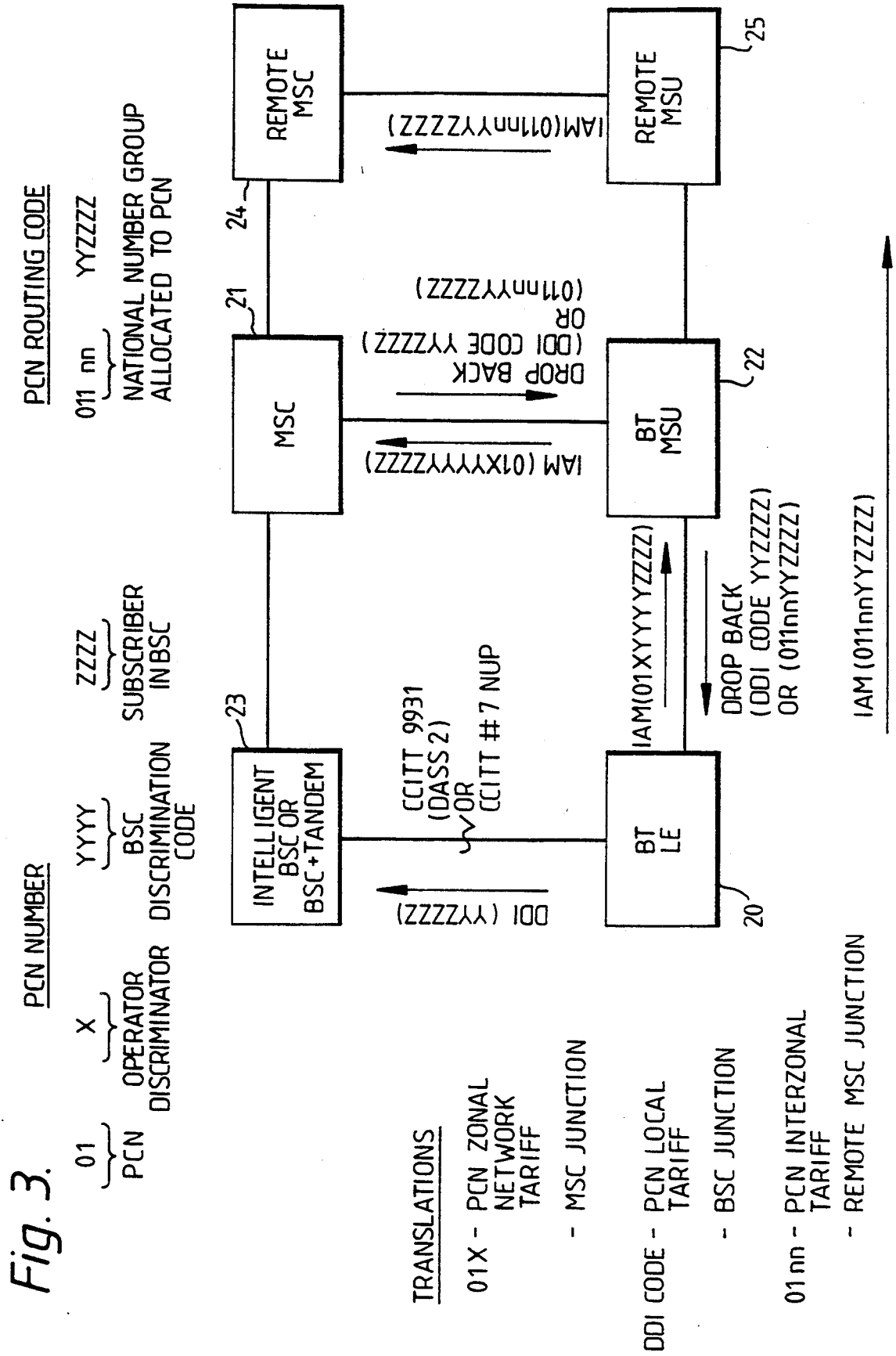
FIG. 3 illustrates a PSTN to PCN call signalling environment.

It is assumed that the PCN number is in the form shown in FIG. 3 but this is not the only possibility. The number has four basic components, a PCN designation, a PCN operator discriminator digit, a BSC discrimination code and a subscriber number within the BSC. Hence as illustrated a PCN number is in the form

01 XYYYY ZZZZ

The choice of 01 for the PCN designation is only one possibility although it is particularly attractive now that it is no longer employed for the London numbers.

In addition to the PCN number there is a PCN routing code, shown in FIG. 3, for routing through this fixed network. This includes a national number group code allocated to the PCN (1 nn) added to the PCN designation (01), two digits of the BSC discrimination code (yy) and the subscriber number within the BSC. The PCN routing code is thus in the form 011 nn YYZZZZ When the PSTN LE 20 receives a call for mobile subscriber 01X YYYY ZZZZ from a PSTN subscriber, it initially translates 01X as being a PCN zonal call with a zonal network tariff and identifies an MSC junction. A number 7 signalling message (IAM 01X YYYY ZZZZ) (PCN number message) is then sent to the nearest MSC 21 via the PSTN main switching unit (MSU) 22. The MSC 21 determines from the location registers whether the called mobile is local, zonal or interzonal. If the call is a zonal call MSC 21 will be that identified and the call proceeds using the zonal tariff i.e. is terminated. However if the call is a local call, then the MSC 21 translates the message to give a DDI code comprising part of the PCN number (DDI Code YYZZZZ), identifying a PCN local tariff and a respective BSC junction (23), and that is sent back (drop back) as a drop back message to the to the local exchange LE 20, which translates and routes it as a CCITT Q 931 or national variant e.g. DASS 2, or a CCITT No 7 NUP, message to the identified BSC 23 and the call proceeds using the PCN local tariff. Alternatively, if the call is an interzonal call then the MSC 21 translates the message to give a national number group PCN routing code, 011 nnYYZZZZ with a PCN interzonal tariff and a remote MSC junction (24) and this is dropped back as a drop back message to the LE 20 and thence sent to the identified remote MSC 24 via MSU 22 and remote MSU 25 as a IAM (011nnYYZZZZ) message and thence to the appropriate mobile.

Figure 4:
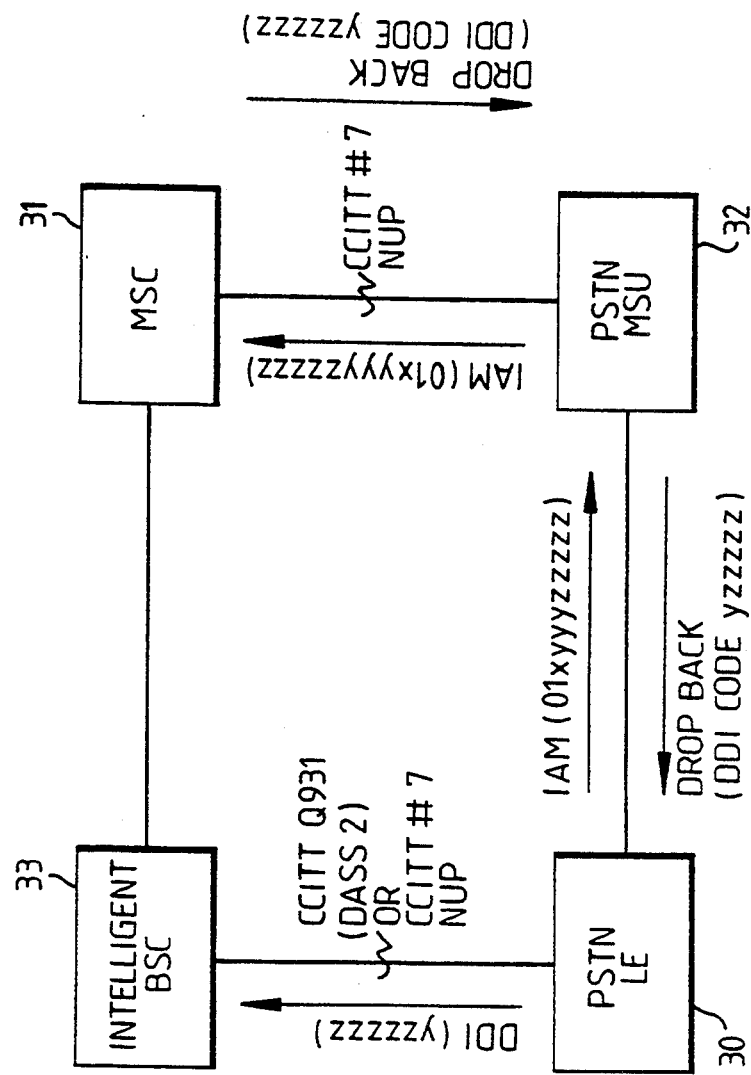
FIG. 4 illustrates another PSTN to PCN call signalling environment.

FIG. 4 illustrates another possible numbering scheme with translations which enables the tariffs to be employed (local and zonal), as opposed to the three tariffs of FIG. 3 (local, zonal and interzonal). In this example the PCN number is in the form

01 X YYY ZZZZZ but this is not the only possibility. The PCN number is comprised, as before, of a PCN designation, an operator discriminator, a BSC discrimination code and a subscriber number within the BSC.

When the PSTN LE 30 receives a call for mobile 01XYYYZZZZZ it translates 01X as being a PCN zonal tariff and gives the nearest MSC junction, MSC 31 in this example. A number 7 signalling message (IAM(01XYYYZZZZZ)) is then sent to MSC 31 via PSTN MSU 32 as illustrated. If the call is a zonal call, as determined by the MSC from the location register, the call will proceed using the zonal tariff i.e. the call is terminated. If the call is not a zonal call, i.e. it is a local call, then the MSC 31 translates the message to give a DDI code comprising part of the message (PCN number) as DDI code YZZZZZ identifying a PCN tariff and a BSC junction (33 in the example) and that is sent back (drop back) to PSTN LE 30, via MSU 32. The PSTN LE 30 routes the message e.g. as a DASS 2 or No 7 signalling message to BSC 33 and the call proceeds using the local tariff.

The interconnect structure of FIG. 2 is such that for all local calls between the PCN (BSC 1) and the PSTN (LE 2), for example, signalling is e.g. DASS 2 or CCITT No 7 (in either direction) and at a local tariff. For PCN to PSTN local calls this is as a result of the intelligent BSC noting that they are local calls and the local MSC function thereof routing them directly to LE 2. For PSTN to PCN local calls this is as a result of the MSC 5 noting that they are local calls and the subsequent drop back.

All zonal calls between the PSTN and the PCN, in either direction, are via the MSC 5 in the conventional manner and involves the zonal tariff.

All interzonal calls between the PSTN and the PCN, in either direction, are via the appropriate MSC, after drop back if necessary, and at the interzonal tariff. A PCN to PSTN interzonal call, e.g. BSC1 to LE 10, is via the nearest MSC to (8) to LE 10 and the relevant PLE (9) in the usual way. A PSTN to PCN interzonal call e.g. LE 2 to BSC 11, is via the nearest MSC 5 to LE 2, to determine the actual MSC required from the location registers, with drop back and translation to the appropriate PCN routing code to reach MSC 8 and thence BSC 11 via the PLE 6 and PLE 9.

The schemes of both FIGS. 3 and 4 assume that the BSC is intelligent. However, a multiple tariff arrangement (zonal/interzonal) can also be envisaged if the BSC has a standard GSM structure i.e. is not intelligent. In this case the local interconnect (cheap local calls) is not provided. Zonal calls will be processed via the MSC 21 and MSU 22 in the conventional manner and use the zonal tariff but interzonal calls (PSTN to PCN) will be identified at the MSC 21 as described above with resultant drop back and retranslation to the PCN routing code and use of the interzonal tariff.

The interconnect structure proposed in FIG. 2 is both flexible and equitable and allows application of multiple tariffs (local and zonal, or local, zonal and interzonal, or zonal and interzonal in the above examples) depending on the actual location of the mobile subscriber. By equitable it is to be understood that the structure supports calls set up in either direction PCN to PSTN or PSTN to PCN, with the same tariffs being applied in both direction. The PSTN does not need to know where the mobile is, rather this is determined from or via the "nearest" MSC and to which the IAM message is first directed, i.e. a gateway having access to the GSM location registers, and sent back to the PSTN as a drop back message (as defined in BTNR 167 Issue 3, July 1987, SS No 7 NUP). Thus the whole of the PSTN fixed network does not have to be given access to the location registers of the PCN and major changes to the fixed network to acquire the location knowledge are not required. The gateway to the PCN (MSC 21 or 31 in the above examples) accepts zonal calls and translates digits received into a DDI code if the call is local, i.e. the mobile is local, or into a PCN national number group code if the call is interzonal. The information message received at (dropped back to) the local exchange is used to restart translation giving a new tariff and a new destination. The fixed network does not require massive change, rather a simple information message is implemented in order to determine mobile location information. Overall, therefore, the PCN is allowed to have different tariffs e.g. for local, zonal or interzonal calls, rather than the present cellular systems which have one tariff for all interconnect purposes. Basically this is achieved by translating a PCN number called by a PSTN subscriber into DDI code for local calls and national network code for distant ones, the basic PCN number resulting in a zonal call and the zonal tariff.

It should be noted that a basic starting assumption of GSM is that the fixed network has access to the location registers but the GSM standard does not disclose how this should be achieved.

Attention is also directed to our co-pending GB Application No. 9013605.2 (Serial No. GB 2249693A) (U.S. application Ser. No. 07/717,319, filed Jun. 18, 1991) (R H Mauger - C Field - A Wilton 4-1-1), which relates to a PCN cordless PABX, the contents of which is also incorporated herein by reference.

Whilst the invention has been described in terms of GSM and PCN communications networks having mobile subscribers, this is not the only application and it is also applicable to other communications standards/systems/networks having mobile subscribers and employing elements equivalent to the BTS, BSC and MSC of the PCN/GSM system.

I claim:

1. A communications system including a communications network having mobile subscribers whose locations are variable, the communications network including means having knowledge as to the location of each of the mobile subscribers, and the communications network including a plurality of series connected mobile-services switching centres; and a PSTN (Public Switched Telephone Network) fixed network including a plurality of series connected first switching units, each of which PSTN fixed network first switching units is interconnected with a respective mobile services switching centre of the communications network via a respective interconnect whereby the PSTN fixed network and the communication network are interconnected at multiple interconnect points, wherein calls are set up between the said networks either by said mobile subscribers or by subscribers to the PSTN fixed network and multiple tariffs are applicable, the tariff employed for any particular call being determined by the location of the mobile subscriber involved in the call and being distance related, the same tariff being employed irrespective of the call set-up subscriber, and wherein for a call set-up to a mobile subscriber by a subscriber to the PSTN fixed network, the location of the mobile subscriber involved in said call is determined from the communication network's knowledge means and the one of said multiple tariffs corresponding to the location of the mobile subscriber involved in said call employed.

2. A system as claimed in claim 1 wherein the communications network is a PCN (Personal Communications Network) network, and includes a base station controller (BSC) connected to a first said mobile-services switching centre (MSC) and the PSTN network includes a local exchange (LE) connected to a first main switching unit (MSU) comprising a said first switching unit, wherein the first MSC is connected to the first MSU via a said interconnect, and wherein set-up of a call by a subscriber to the PSTN network to a mobile subscriber includes sending of a message identifying the mobile subscriber involved in the call to the first MSC, determination of the location of the mobile subscriber from PCN location registers which comprise said communications network's knowledge means and, if appropriate for the determined location connection of the call via the BSC and employment of a first tariff, or if connection via the BSC is not appropriate for the determined location connection of the call via the BSC and employment of a first tariff, or if connection via the BSC is not appropriate for the determined location transmission of a drop back message to the LE for translation thereby for transmission to another MSC of the PCN network and employment of a second tariff.

3. A system as claimed in claim 2 wherein the PCN network includes a second MSC connected to the first MSC, the PSTN network includes a second MSU connected to the first MSU, and the second MSC is connected to the second MSU via a respective one of said interconnects, wherein call set-up by a subscriber to the PSTN fixed network from the LE to a mobile subscriber associated with the second MSC includes the sending of a respective message identifying the mobile subscriber involved in the call to the first MSC, determination of the location of the mobile subscriber associated with the second MSC from the PCN location of the mobile subscriber associated with the second MSC from the PCN location registers, and transmission of a respective drop back message to the LE for translation thereby for transmission to the second MSC via the second MSU and employment of a third tariff.

4. A communication system as claimed in claim 1 wherein the communications network is a PCN network and includes a base station controller (BSC), a first said mobile-services switching centre (MSC) and a second said MSC connected in series, wherein the PSTN includes a local exchange (LE), a first principal location exchange (PLE) comprising one of said first switching units and a second PLE comprising another of said first switching units connected in series, the BSC being connected to the LE via a local interconnect, the first MSC being connected to the first PLE via a respective one of said interconnects which provides a zonal interconnect between the BSC and the LE and the second MSC being connected to the second PLE via a respective one of said interconnects which provides an interzonal interconnect, and wherein a respective tariff is associated with each interconnect.

5. A communications system as claimed in claim 1, wherein the communications network is a PCN network, wherein for calls set up by a subscriber to the PSTN fixed network to a mobile subscriber location of the mobile subscriber is determined, at a gateway to the PCN which accepts zonal calls, from location registers of the PCN which comprise said communications network's knowledge means, which zonal calls involve a zonal tariff, and wherein if the calls are not zonal the gateway translates the message received identifying the mobile subscriber involved in the call into a DDI (Direct Dialing In) code if the call is local or a national number group code if the call is interzonal, which translated messages are dropped back to the PSTN which restarts translation giving a new tariff and a new destination appropriate thereto.

* * * * *